United States Patent Office 3,395,895
Patented Aug. 6, 1968

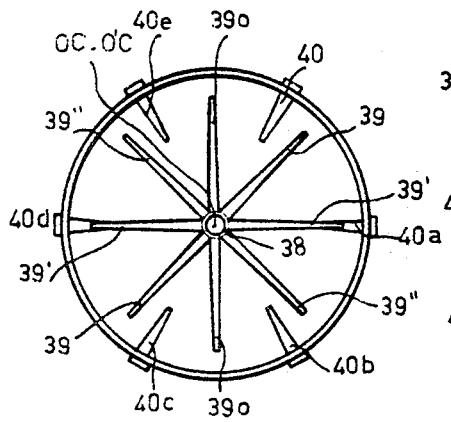
FIG.11
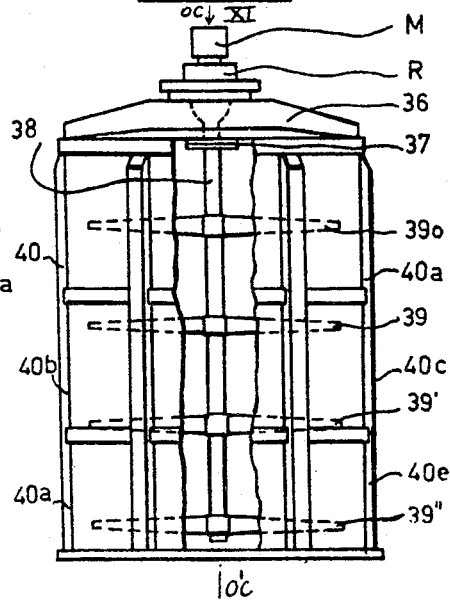
FIG.12
FIG.13a
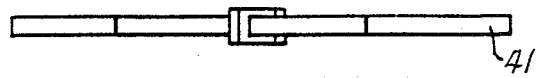
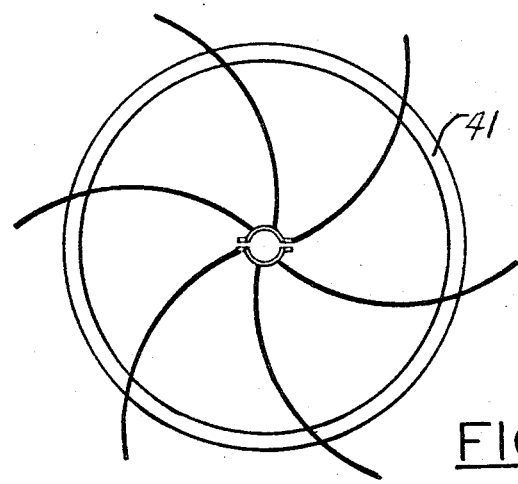
FIG.13

3,395,895
PROCESS AND APPARATUS FOR PUTTING KAOLIN IN AN ABSOLUTELY HOMOGENEOUS SUSPENSION
Jacques E. Cellier, B.P. 58 Rue de Maroc, Aix-les-Bains, France
Filed July 11, 1966, Ser. No. 564,066
8 Claims. (Cl. 259—43)

ABSTRACT OF THE DISCLOSURE

In an apparatus for mixing ingredients is provided a rotary assembly composed of six radial blades and an olive-shaped part coaxial to the latter and equipped with helical blades on its own surface; the rotation of this assembly stirs the ingredients which are constantly drawn toward the bottom according to the vortex created by the bladed part. Fixed elements disposed in the vat of the mixer and constituting deflectors prevent the ingredients from turning in a single mass in the vat of the mixer. A fixed strainer constituted by an interior grill concentric with a sector of the mixer vat, the grill being generally cylindrical and slightly conical, let pass toward the delivery conduits of the vat only those particles of the ingredients which are fine enough to be admitted without inconvenience into one or the other of two agitation tanks, which are utilized sequentially in closed fluid circuit with the mixer to mix successive batches of the kaolin and water which constitute the principal ingredients.

---

The present invention has for its object a process for putting kaolin in an absolutely homogeneous suspension commonly used in the manufacturing of paper, particularly of surface-coated paper. The milk of kaolin obtained according to this process can be transported in the liquid state in any appropriate container; even without agitation, it does not decant itself nor precipiate. It can be incorporated as such in the mass of the paper paste, or used for the surfacing or the coating of the paper at the end of the manufacturing.

The pigments, taken in the solid state, are put in suspension at a very high concentration in a mixer which will be described later on.

The preparation is then directed into a cycling tank, under agitation, from where, after filtering, a transfer tank dispatches it to the ultimate, large capacity, reinforced storage tanks; all these tanks contain agitators rotating more and more slowly and maintaining the homogeneity of the mass of gaolin in suspension.

The tanks are characterised by a vertical, axial shaft of the pendular type (without lower bearings) whose paddles—as well as the counter paddles fixed to the interior wall of the tank—have a transverse section whose profile chases the stirred liquid towards the top or towards the bottom according to the mounting of each paddle, in order to create in the liquid mass the general turbulence desired, while ensuring the self-guiding of the rotary agitator assembly, which permits the latter to continue to function empty without being thrown out of centre which could cause damage. A terminal lower screw with curved blades (called "American") confirms the self-centering in the tanks of large dimensions.

The preparation obtained according to the process and with the apparatus which is the object of the present invention, benefits from the following industrial characteristics:

(1) Relatively low viscosity
(2) Very high degree of dispersion
(3) Reduced storage volume
(4) Negligible variation of quality
(5) High concentration, near the dilation point of kaolin
(6) Improvement of the brilliance of the coated paper.

The annexed drawings show by way of non-limiting example one application of the invention to an apparatus having two agitator tanks and one large capacity storage tank.

In the drawings:

FIGURES 1 to 3 are spread out diagrams of the invention, viewed in elevation; the diagram has been divided in three figures in order to adequately put the diagram on pages. Specifically, FIGURE 1 shows the device for feeding the mixer beginning from the discharge wagon; FIGURE 2 shows the assembly constituted by the mixer and its two agitator tanks; FIGURE 3 shows the assembly constituted by the filters, the transfer tank and the large capacity storage tank.

FIGURE 11 is a plan view of an agitator tank, according to the arrow XI of FIGURE 12.

FIGURE 12 is an elevation, partially in vertical section, of the same tank.

FIGURE 13 is a horizontal section of the "American" impeller of a large storage tank.

FIGURE 13A is a front elevational view of the impeller shown in FIGURE 13.

Figure 1:
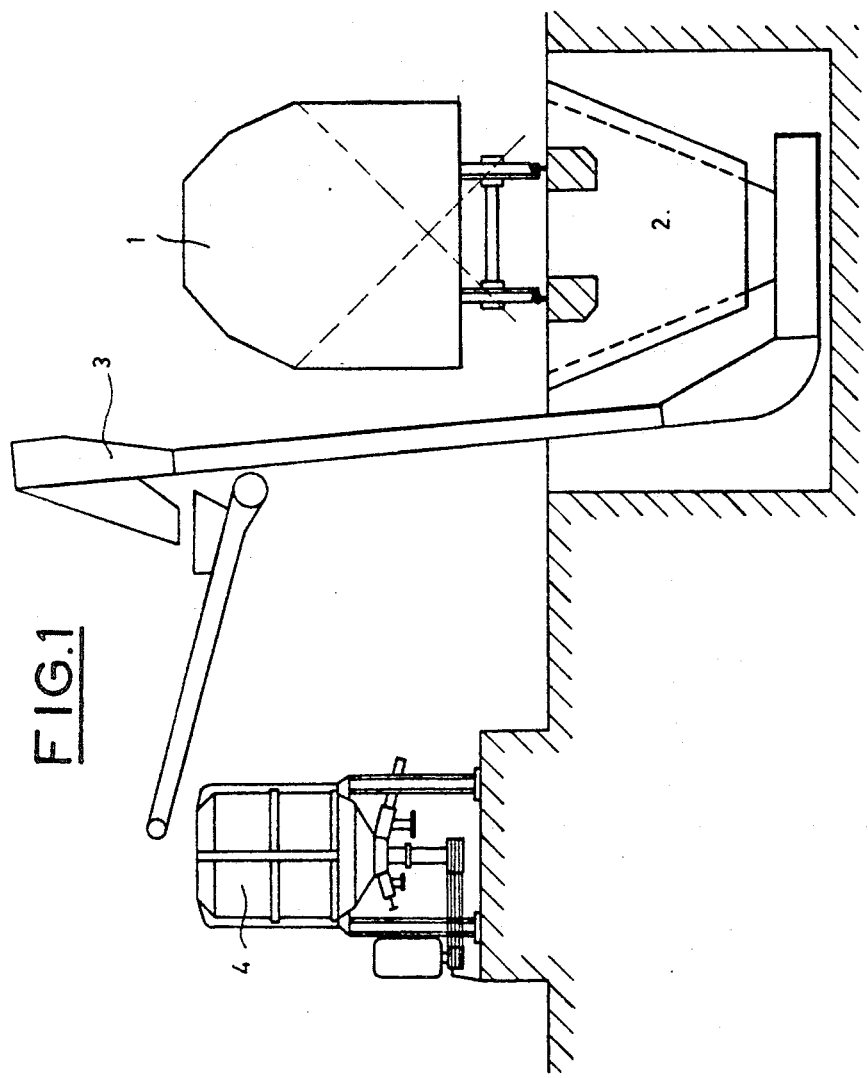
Figure 2:
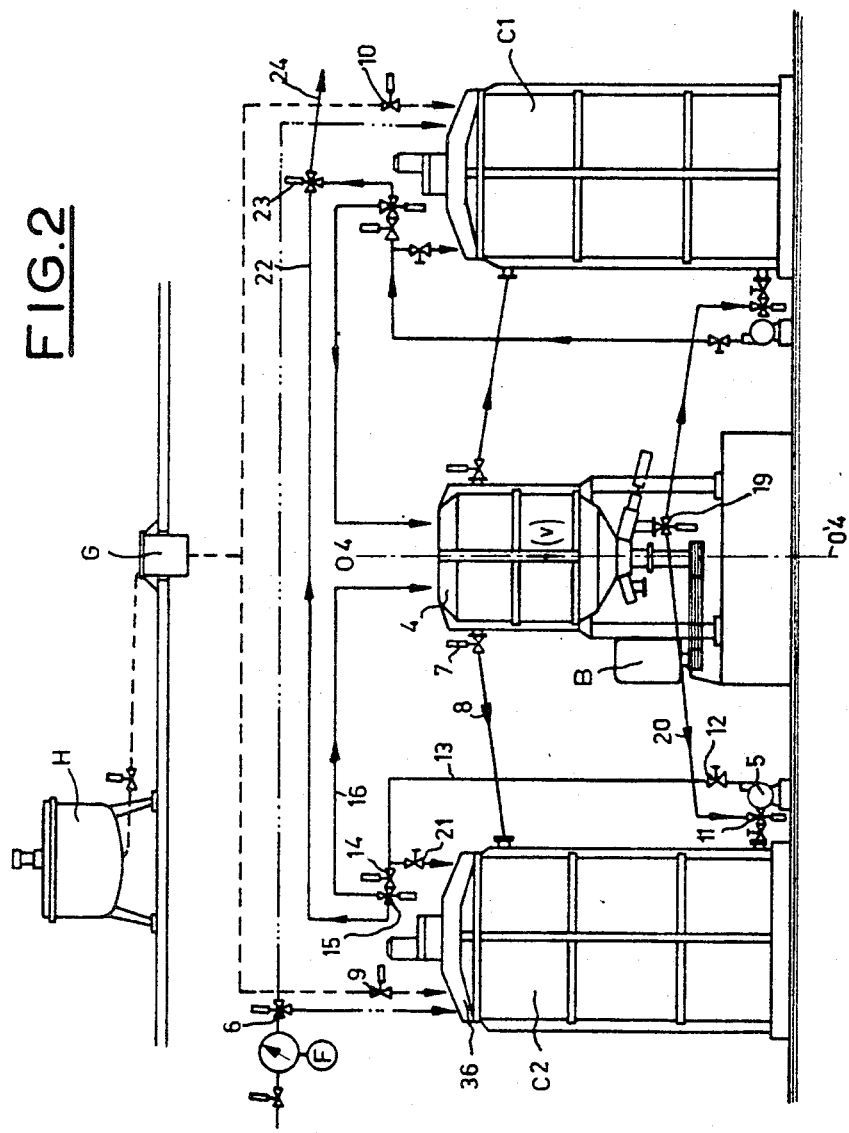

In FIGURE 1, the bilateral discharge wagon 1, stopped above a hopper 2, delivers the dry kaolin to the elevator 3, which in turn discharges it into the mixer 4, where the pigments are put in aqueous suspension of very high concentration.

Figure 4:
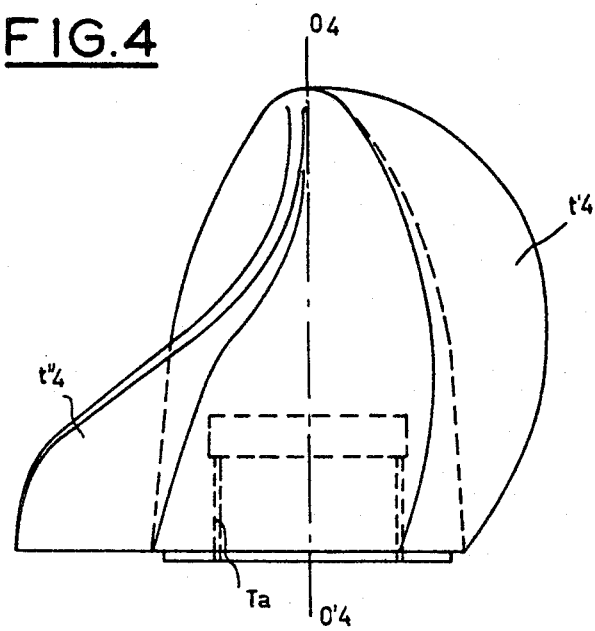
FIGURE 4 is an elevation of the olive-shaped boss of the turbine of the mixer.
Figure 5:
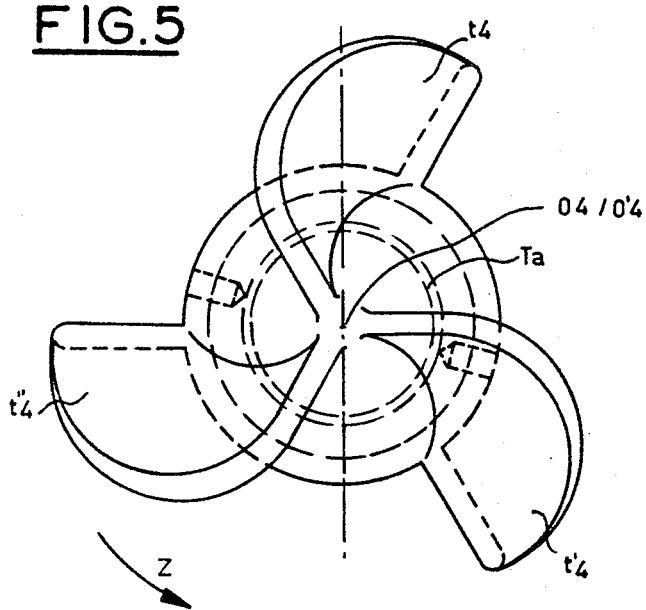
FIGURE 5 is an axial view of the same.

The mixer (FIGURES 2, 4, 5, 6 and 7) comprises, at its lower part, a screw S having six paddles disposed in three groups of super-posed radial arms. The two upper arms U1 and U2 of this screw are inclined in such a way to suck the liquid in which they are immersed. This action, which is exerted towards the bottom, continues and completes the action of the bladed boss T4. Two horizontal arms M1 and M2 create a local turbulence and the two lower arms L1 and L2 are themselves inclined with respect to the horizontal to cause the return of the liquid towards the upper part of the mixer. The arrangement of these six paddles turning at high speed and combined with the bladed boss, constantly stirs the milk of kaolin, sucking it in the axial zone and rejecting it towards the top in the peripheral zone. The radial arms turn around the geometrical vertical axes $0_4$–$0'_4$ of the mixer, which is also the axis of the bladed boss T4 rigid with the screw S and thus turning with it at the same angular speed. This piece is shown in detail in FIGURES 4 and 5. In particular, it can be seen that it bears three tangential helicoidal blades $t4$, $t'4$ and $t''4$ whose profile is designed so that their rotation creates above the boss, a vortex V drawing the liquid contained in the vat 4 of the mixer towards the bottom, so that the total mass of the milk of kaolin passes in the zone stirred by the screw S. The base of the boss T4 carries a thread Ta screwed on a corresponding thread which is at the top of the shaft of the screw S. The rotation—counter clockwise viewed from above (arrow Z, FIGURE 5)—tends to tighten the assembly of rotary elements which have just been described.

Figure 6:
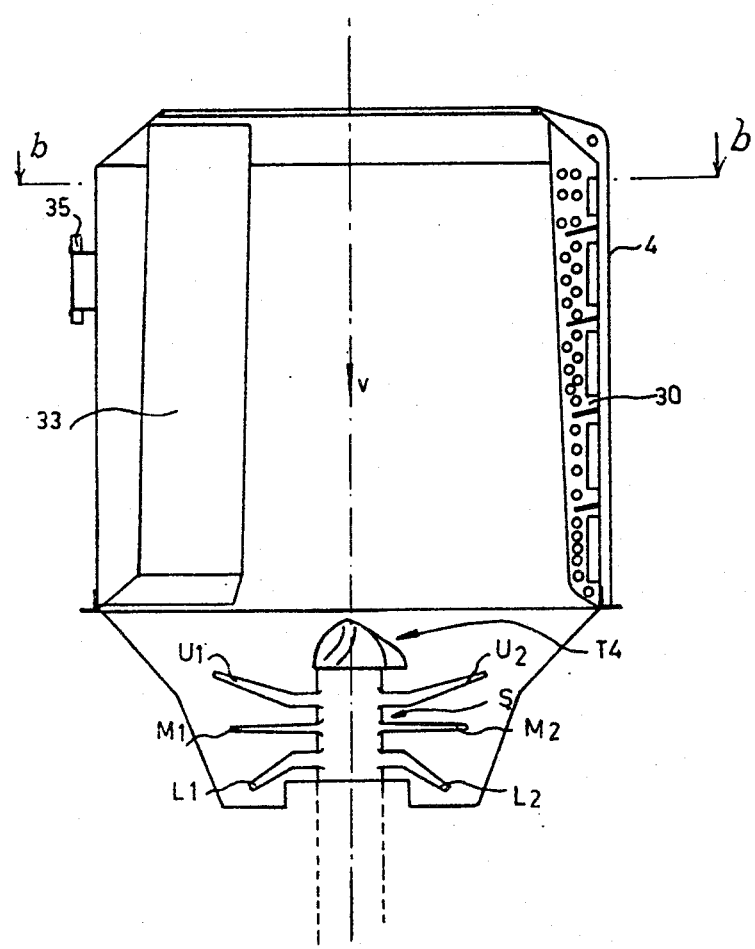
FIGURE 6 is a vertical section of the vat of the mixer taken along section $a$—$a$ of FIGURE 7.
Figure 7:
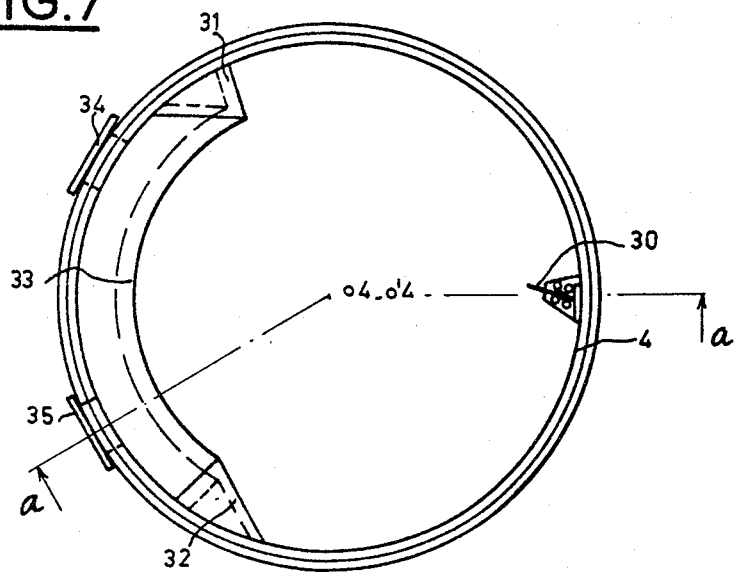
FIGURE 7 is a horizontal section along $b$—$b$ of FIGURE 6.
Figure 8:
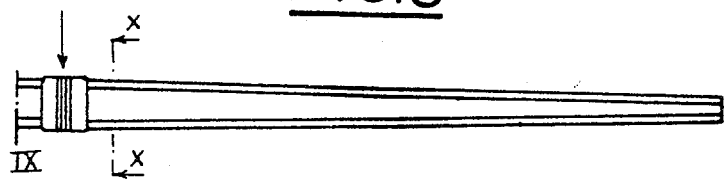
FIGURE 8 is a view of a paddle taken in the direction of arrow VIII of FIGURE 9.
Figure 9:
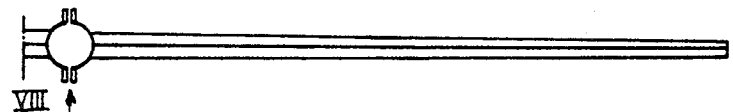
FIGURE 9 is a view of the same paddle taken in the direction of arrow IX of FIGURE 8.

The vat 4 of the mixer (FIGURES 6 and 7) has an almost cylindrical shape about a vertical axis, more exactly very slightly conical, widening towards the bottom to prevent any risk of choking of the kaolin near the rotary elements. It is equipped with two types of fixed elements:

(1) Deflector-baffles provided to maintain, in the liquid mass, a turbulence preventing any tendency towards the rotation of the mass (which would compromise the homogeneity of the milk of kaolin during preparation). These baffles are themselves of two kinds:

(a) At least one baffle 30 of perforated sheet metal, fixed obliquely with respect to the generatrix of the conical vat: FIGURE 6 shows that this baffle narrows slightly towards the bottom, also to prevent an eventual choking of the kaolin in the lower region of the vat. The example described has only one baffle; but it could have more than one.

(b) Two prismatic deflectors 31 and 32 constituting vortex breakers like the baffle 30, and flanking the strainer 33 at its two ends.

(2) A fixed filtering element, constituted by the strainer 33, of perforated sheet metal, and disposed concentrically inside a sector of the vat 4, facing the delivery orifices 34 and 35. The role of this piece is to allow the exit from the mixer of only homogeneous liquid not containing particles of kaolin of a diameter exceeding the fixed norm.

The screw and the bladed boss of the mixer 4 turn at an average speed of 500 revolutions per minute, while the pump 5, discharging 50 cubic meters per hour, establishes the closed preparation circuit between the mixer 4 on the one hand, and the storage tanks C1 and C2 on the other hand. These tanks being identical, the circuit for the preparation of the milk of kaolin will only be described between the mixer 4 and the tank C2, a homologous circuit functioning between the mixer and the tank C1 when the tank C2 is emptying in the direction of the filters, when its circuit with the mixer is cut. The process is the same for the tank C1, so that the tanks function in continuous manner, alternatively in closed circuits with the mixer or in discharge towards the filters.

The tank C2 receives thus in the course of its operation in closed circuit with the mixer 4:

(a) The preparation coming from the mixer by the sluice-valve 7 and the pipe 8;

(b) The water, discharged through the counter F, and which the sluice-valve 6 which has three conduits sends alternatively to the tank C2 or the tank C1, according to the circuit in operation, (c) The dispersant brought from its storage tank H to a dosimeter G, then, alternatively, according to the water, to the tanks C2 or C1 by the sluice-valve 9 or 10.

Each tank C1 or C2 (FIGURES 11 and 12) is constituted by a vertical cylindrical body having, according to its general vertical axis $0c, 0'c$:

(1) A framework support 36 of large dimensions and anchored to the upper collar;

(2) A motor M and its reducer R with a reinforced low-speed shaft, and interior greasing by a pump incorporated into the motor-reducer assembly;

(3) A rigid coupling sleeve 37 maintaining the driven shaft 38 strictly in the vertical axis $0c-0'c$;

(4) The vertical tubular shaft 38 driven by the motor-reducer assembly M–R in its angular movement around the axis $0c-0'c$. The shaft is of the pendular type, that is to say there is no bearing guide at the bottom of the vat, in order to eliminate the disadvantage of abrasion by the particles of kaolin, which no rolling gear can resist for long.

(5) Four stirring paddles $39^0$, 39, 39' and 39''.

(6) Six counter-paddles 40, 40a, 40b, 40c, 40d, and 40e, welded onto the interior wall of the vat. These paddles are clearly shown on FIGURE 11, and only schematically on FIGURE 12, so as not to overload the drawing.

Figure 10:
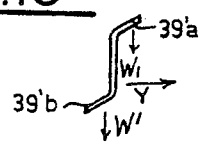
FIGURE 10 is a transverse section of a paddle along X—X of FIGURE 8.
Figure 10A:
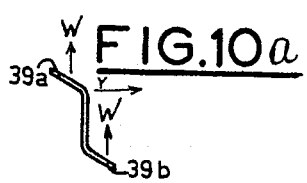
FIGURE 10a is an analogous section of a paddle "turned inside out."

FIGURES 10 and 10a shows the transverse section of two paddles, identical but of which 1 (FIGURE 10a) is mounted "inside out" with respect to the other. This means that one of the two paddles is mounted in reverse with respect to the direction Y of their rotation. Their transverse section in the form of an obtuse angled (60°) Z means that half the paddles, by their end portions 39a, 39b, push the liquid towards the top (arrows W, FIGURE 10a), while the other half, by their end portions 39'a, 39'b, push the liquid towards the bottom (arrows W', FIGURE 10). It is the same for the counter-paddles, with respect to their profile and their mounting.

There results a stirring and a generalised turbulence which does not allow any stagnant zone for the mass of the liquid, even with a relatively slow speed of rotation of the paddles.

Moreover, this equilibrium of the stresses furnished by the paddles thus inverted, assures a self-guiding of the rotary assembly which cannot tend to move off centre. Experience has shown that this equilibrium, combined with the mounting of the perpendicular axle 38 in its rigid upper sleeve 37, can permit it to turn empty (for example, during the emptying of the vat) without throwing itself off centre or turning aside, thus without risk of breaking. The perpendicular axle and its paddles remain strictly rigid with the reducer R.

When the admission of water and of dispersant is stopped after the introduction of the required quantities, and the kaolin has been brought into the mixer 4, the closed circuit, assured by the pump 5, is established as follows: from the tank C2, the liquid passes through the sluice valve 11 having three conduits, the pump 5, the sluice-valve 12, the pipe 13, the sluice-valves 14 and 15, the pipe 16, the mixer 4, the sluice-valve 7, and the pipe 8 which brings it back to the tank C2.

In this way a milk of kaolin is obtained with a perfect homogeneity, a creamy consistency and an easy flow. The maximum concentration is very near the point of dilation of the kaolin. It is then that the mixer 4 is entirely emptied into the tank C2, according to the following circuit: from the mixer, the milk of kaolin, passing through the sluice-valve 19, the pipe 20 and the sluice-valve 11, is sent by the pump 5, through the sluice-valve 12, the pipe 13 and the sluice-valve 21 into the tank C2 (the sluice valves 7, 14 and 15 are closed).

While the mixer is being recharged (FIGURE 1) and put in closed circuit with the tank C1, the tank C2 is emptied in the direction of the filters by the sluice-valve 15 having three conduits (re-opened towards the left of FIGURE 2), the pipe 22, the sluice-valve 23, the pipe 24, the sluice-valve 25 (FIGURE 3) having three conduits, which direct the milk of kaolin into the three vibrating filters $J^0$, J1, J2. The filtered product passes into the transfer tank K, from where the double pump L directs it into the large tank N where it is stored with slight agitation by a rotary assembly turning at eight revolutions per minute.

Figure 3:
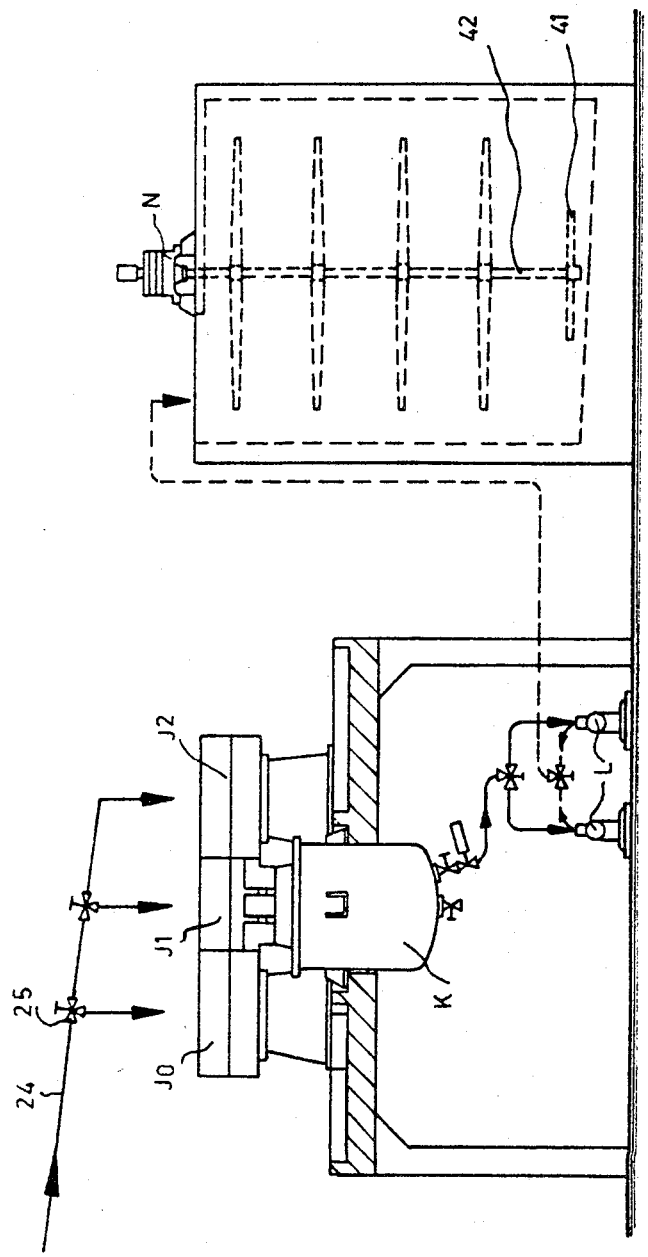

FIGURE 3 shows only one of these tanks, which can evidently be in any number. Their dimensions and their capacities are much larger than those of tanks C1 and C2; also the structure of their rotary assembly includes, in addition to four paddles of large height, and of Z profile analogous to that of the paddles previously described, a supplementary screw 41 called "American" with curved blades (FIGURE 13), mounted at the lower end of the pendular shaft 42, and which contributes to the self-centering of this axle of which the length can reach or exceed 8 meters.

The apparatus which has just been described combines, according to an original process, the effects of the different elements which comprise it, in order to obtain a new industrial product, perfectly homogeneous milk of kaolin, neither decanting nor precipitating, even when it is transported without agitation. It benefits from a slighted elevated viscosity of the solution having regard to the concentration.

The preparation obtained allows a better coverage of the support (paper), which permits the thickness of the superficial coating to be reduced with the same guarantee with respect to the impression. The product resulting from the invention appreciably improves the brilliance of the coated paper.

Finally the apparatus according to the invention permits, for example, a single operator to put in suspension quantities of the order of 250 tons of kaolin in a day, with a mixer of 6 cubic meters, averaging a small consumption of electricity for driving the motor B of the mixer, the pumps and filters, and the control relays of the several sluice-valves.

What is claimed is:

1. Apparatus for mixing ingredients comprising:
   (a) a mixer adapted to receive and to form a mixture of said ingredients,
   (b) an agitation tank for agitating said mixture,
   (c) means for establishing a closed circuit including the mixer and the agitation tank,
   (d) means for circulating said mixture through said closed circuit,
   (e) means for interrupting said closed circuit,
   (f) a second agitation tank for agitating said mixture,
   (g) means for establishing a second closed circuit during interruption of the first closed circuit, said second closed circuit including said mixer and said second agitation tank,
   (h) means for circulating the mixture through said second closed circuit,
   (i) means for interrupting said second closed circuit,
   (j) and means for emptying the mixture from both the mixer and said agitation tanks.

2. Apparatus according to claim 1 in which said mixer comprises:
   (1) a vat,
   (2) a motor driving a vertical shaft, said shaft protruding upwards into the vat through its bottom,
   (3) said shaft carrying helical blades on its upper end, said blades being adapted, during rotation of the shaft, to draw the mixture downwards,
   (4) said shaft also carrying a plurality of paddles disposed below the helical blades, there being a first paddle adapted to draw the mixture downwards, a second paddle adapted to stir the mixture, and a third paddle adapted to push the mixture upwards.

3. Apparatus according to claim 2 in which said mixer includes at least one baffle mounted on the interior wall of the vat, and a strainer adapted to strain the mixer as it leaves the vat.

4. Apparatus according to claim 1 in which at least one of said agitation tanks includes a vertical, pendular shaft supported at its top but free at its bottom, said shaft being rotatable and carrying a plurality of paddles, some of which are adapted to push the mixture downwards and others of which are adapted to push the mixture upwards.

5. Apparatus according to claim 1, including filtering means adapted to filter the mixture during emptying of either agitation tank, and delivery means adapted to deliver the filtered mixture to a storage tank, said storage tank being provided with a rotatable, vertical, pendular shaft supported at its upper end but free at its lower end, and a plurality of paddles mounted on said shaft, some of said paddles being adapted to push the mixture downwards, and others of said paddles being adapted to push the mixture upwards.

6. A process for preparing an aqueous suspension of kaolin comprising the steps of:
   (1) introducing kaolin in the solid state and water into a mixer, and mixing them in the mixer,
   (2) pumping the mixture through a closed circuit including an agitation tank,
   (3) agitating the mixture in the agitation tank as the mixture circulates therethrough,
   (4) emptying the mixture both from the mixer and from the agitation tank,
   (5) introducing another batch of solid-state kaolin and water into the emptied mixer, and mixing them in said mixer,
   (6) pumping the mixer through a second closed circuit including a second agitation tank,
   (7) agitating the mixture in the second agitation tank as the mixture circulates therethrough, and
   (8) emptying the mixture both from the mixer and from the second agitation tank.

7. A process according to claim 6, including the step of filtering the mixture after it has been emptied from the mixer.

8. A process according to claim 7, in which the mixture is emptied from the mixer into the agitation tank, and is then emptied from the agitation tank through a filter.

References Cited

UNITED STATES PATENTS

| 3,266,871 | 8/1966 | Mizoguchi et al. | 259—66 XR |
| 3,326,815 | 6/1967 | Werner et al. | 259—8 XR |

WALTER A. SCHEEL, *Primary Examiner.*

J. M. BELL, *Assistant Examiner.*